(12) United States Patent
Halley

(10) Patent No.: US 7,761,570 B1
(45) Date of Patent: Jul. 20, 2010

(54) EXTENSIBLE DOMAIN NAME SERVICE

(75) Inventor: Robert Thomas Halley, Redwood City, CA (US)

(73) Assignee: Nominum, Inc., Redwood City, CA (US)

( * ) Notice: Subject to any disclaimer, the term of this patent is extended or adjusted under 35 U.S.C. 154(b) by 1365 days.

(21) Appl. No.: 10/870,282

(22) Filed: Jun. 16, 2004

Related U.S. Application Data

(60) Provisional application No. 60/483,393, filed on Jun. 26, 2003.

(51) Int. Cl.
*G06F 15/16* (2006.01)
(52) U.S. Cl. ...................... 709/226; 709/246
(58) Field of Classification Search .................. 709/230, 709/226, 246
See application file for complete search history.

(56) References Cited

U.S. PATENT DOCUMENTS

| | | | |
|---|---|---|---|
| 6,182,136 B1 | 1/2001 | Ramanathan et al. | |
| 6,244,758 B1 | 6/2001 | Solymar et al. | |
| 6,834,302 B1* | 12/2004 | Harvell | 709/229 |
| 2002/0143984 A1 | 10/2002 | Michel | |
| 2002/0161745 A1 | 10/2002 | Call | |
| 2003/0009591 A1* | 1/2003 | Hayball et al. | 709/245 |
| 2003/0074461 A1* | 4/2003 | Kang et al. | 709/245 |
| 2004/0139086 A1 | 7/2004 | Hasenau | |
| 2004/0148301 A1 | 7/2004 | McKay et al. | |
| 2005/0015374 A1 | 1/2005 | Reinauer et al. | |
| 2005/0114367 A1 | 5/2005 | Serebrennikov | |
| 2005/0141485 A1 | 6/2005 | Miyajima et al. | |
| 2006/0101026 A1 | 5/2006 | Fukushima | |

OTHER PUBLICATIONS

Mockapetris, "Domain Names—Concepts and Facilities," Network Working Group, Nov. 1987, STD 13, RFC 1034, located at http://www.ietf.org/rfc/rfc1034.txt.
Mockapetris, "Domain Names—Implementation and Specification," Network Working Group, Nov. 1987, STD 13, RFC 1035, located at http://www.ietf.org/rfc/rfc1035.txt.

* cited by examiner

*Primary Examiner*—Jungwon Chang
(74) *Attorney, Agent, or Firm*—Gard & Kaslow LLP

(57) ABSTRACT

The invention disclosure describes an extended DNS data having an extensible attribute as well as systems and methods that utilize this attribute. Typically, the extensible attribute includes both attribute data and metadata configured to indicate a type of the attribute data. By varying the metadata, different instances of the attribute data may include different data types. The attribute data is configured, for example, to characterize other fields in the extended DNS data and/or to enable new applications relating to DNS data.

In various embodiments the extensible attribute within the extended DNS is accessed through an application programming interface (API). This API is configured to facilitate input and output of the extended DNS data and to allow an external application to identify and interchange those attribute data that the external application is configured to process.

24 Claims, 4 Drawing Sheets

| | Name Field 220 | Address Field 230 | Extensible DNS Field 240 | |
|---|---|---|---|---|
| | | | Metadata 250 | Attribute Data 260 |
| 210A | | | | |
| 210B | | | | |
| 210C | | | | |
| 210D | | | | |
| 210E | | | | |
| 210F | | | | |

200

EXTENSIBLE DOMAIN NAME SERVICE

CROSS-REFERENCE TO RELATED APPLICATIONS

This application claims benefit of commonly owned U.S. Provisional Patent Application No. 60/483,393, entitled "Extensible Domain Name Service" and filed Jun. 26, 2003. The disclosure of which is herein incorporated by reference.

BACKGROUND

1. Field of the Invention

The invention is in the field of computer science and more specifically in the field of network protocols.

2. Prior Art

The Internet is a network of computing systems configured to communicate with each other. Communication is accomplished using a system of unique numerical addresses such as Internet Protocol (IP) addresses. However, computing systems connected to the internet are also addressable using "domain names" such as www.nominum.com. When a domain name is used to specify a location on the internet, the domain name is translated (i.e., "resolved") into the IP address of that location by the Domain Name System (DNS). The DNS also stores other types of information that may be looked up by domain name, such as information for routing electronic mail.

Internet domain names are arranged hierarchically. For example, the domain name www.nominum.com is part of the "nominum.com" domain, which in turn is a subdomain of the "com" domain, which is a subdomain of the "root domain." The root domain can be viewed as a parent domain of "corn," which in turn is a parent domain of "nominum.com," etcetera. Other valid addresses defined under the nominum.com domain may include, for example, "products.nominum.com" or "sales.nominum.com." Often a domain name is used in conjunction with directory or file information to form a Universal Resource Locator (URL) associated with a specific file (e.g., www.nominum.com/main/products.html).

Information to be looked up in the DNS is stored in servers referred to as "authoritative servers." An authoritative server stores the information pertaining to a particular domain, exclusive of any subdomains that have been delegated to their own authoritative servers. Additionally, servers that are authoritative for a parent domain store information identifying servers authoritative for its delegated subdomains, for use in referring information requests.

When a domain name is entered at a client computer, the client computer typically queries a local "caching server" which resolves the name into an IP address or other desired DNS information on the client's behalf and then returns the information to the client. This caching server may, for example, be managed by a local interne service provider.

The caching server resolves names by querying one or more authoritative servers. For example, to resolve the name "www.nominum.com," a typical caching server may first query one of the servers authoritative for the root domain, which responds with a "referral response" including referral information identifying the server4s authoritative for the "corn" domain. The caching server then queries one of the servers authoritative for the "corn" domain, which responds with another referral response identifying the servers authoritative for the "nominum.com" domain. Finally, the caching server queries one of the servers authoritative for the "nominum.com" domain, which responds with an "answer response" containing the desired answer information regarding www.nominum.com.

The caching server also includes a cache of information previously received from authoritative servers as a result of past queries, so as to improve efficiency by avoiding repeated queries. Typically, cache data are stored in a tree structure such that navigating the cache starting from a root node yields either the desired answer or, when the answer is not present, identifies the closest parent domain for which cached information identifying its authoritative servers is present, allowing that information to serve as a starting point for the process of querying authoritative servers as described above. In a typical cache, information from both answer responses and referral responses is stored in the same tree structure. When the cache data are stored in a tree structure, a search of the cache can be accomplished in a time roughly proportional to log(n), where "n" is the size of the cache.

The Domain Name Service generates a result of fixed format and type when a domain name is resolved. This rigid structure limits the Domain Name Service to a restricted set of operations. There is a need for performing additional operations that improve the efficiency and utility of the Domain Name Service.

SUMMARY OF THE INVENTION

The invention includes extended DNS data having one or more extensible attributes as well as systems and methods that utilize these extensible attributes. The extensible attributes include both attribute data and metadata configured to indicate a type of the attribute data. The attribute data is configured, for example, to characterize other fields in the extended DNS data and/or to enable new applications relating to DNS data.

In various embodiments, the extensible attributes are accessed through an application programming interface (API). This API is configured to facilitate input and output of the extended DNS data. In some embodiments, the extended DNS data is presented to applications in a neutral interchange format. This format allows an external application to identify and interchange those attribute data that the external application is configured to use further while disregarding those attribute data not defined within the application.

The invention further includes several systems and methods of managing extended DNS data using an extensible attribute. This management includes load balancing of DNS services, variation in DNS data presentation, sorting of DNS data, DNS data expiration management, and the like.

Various embodiments of the invention include a network application system configured to store extended DNS data, the extended DNS data comprising a data field configured to store a domain name, a data field configured to store DNS information, and an extensible DNS field configured to store attribute data and metadata, the metadata configured to characterize a type of the attribute data.

Various embodiments of the invention include a network application system comprising data storage configured to store extended DNS data, the extended DNS data including an extensible DNS field configured to store attribute data and metadata, the metadata configured to characterize a type of the attribute data, a data driver configured to read from or write to the data storage, and to convert the extended DNS data between a neutral interchange format and a format used to store the extended DNS data in the data storage, the neutral interchange format including an attribute field and a metadata field, the metadata field being configured for storing data characterizing data stored in the attribute field, and a DNS server configured to exchange the extended DNS data with the data driver in the neutral interchange format, to parse the data in the neutral interchange format, and to translate a domain name to DNS information.

Various embodiments of the invention include a computer readable medium having stored thereupon computer code configured to provide domain name services, the computer code comprising a code segment configured to read extended DNS data, the extended DNS data including an extensible DNS field configured to store attribute data and metadata, the metadata configured to characterize a type of the attribute data, a code segment configured to convert the read extended DNS data to a neutral interchange format, the neutral interchange format including an attribute field and a metadata field, the metadata field being configured for storing data characterizing data stored in the attribute field, and a code segment configured to output the read extended DNS data.

Various embodiments of the invention include a method of accessing DNS data, the method comprising receiving a data request for DNS data, accessing data storage to read extended DNS data, the extended DNS data including an extensible DNS field configured to store attribute data and metadata, the metadata configured to characterize a type of the attribute data, and outputting at least part of the read extended DNS data.

Various embodiments of the invention include a method of storing DNS data, the method comprising receiving DNS data, and storing the received DNS data in a data storage configured to store extended DNS data, the extended DNS data including an extensible DNS field configured to store attribute data and metadata, the metadata configured to characterize a type of the attribute data.

Various embodiments of the invention include a method of ranking DNS data, the method comprising reading a plurality of DNS data sets, each of the plurality of DNS data sets including an extensible DNS field and a name field, identifying metadata within each extensible DNS field, using the read metadata to identify attribute data in each extensible DNS field, and ranking the DNS data sets based on the attribute data.

Various embodiments of the invention include a domain name service comprising means for receiving a request for DNS data, means for reading extended DNS data in response to the request, the extended DNS data including an extensible DNS field configured to store attribute data and means for characterizing a type of the attribute data, and means for outputting at least part of the read extended DNS data.

Various embodiments of the invention include a domain name service comprising means for receiving DNS data, means for storing the received DNS data in a data storage configured to store extended DNS data, the extended DNS data including an extensible DNS field configured to store attribute data and metadata, the metadata configured to characterize a type of the attribute data.

BRIEF DESCRIPTION OF THE VARIOUS VIEWS OF THE DRAWING

DETAILED DESCRIPTION OF THE INVENTION

The utility of DNS data is improved with the addition of one or more extensible data fields. These data fields are optionally bound to DNS data, such as a domain name, a set of DNS records, and individual DNS record, or the like. In various embodiments, systems configured to use this extended DNS data (i.e., DNS data having an extensible data field) are able to perform new DNS operations such as ranking of DNS responses, referral load balancing, hierarchical access control, customization of DNS data presentation, DNS data filtering, or the like.

Figure 1:
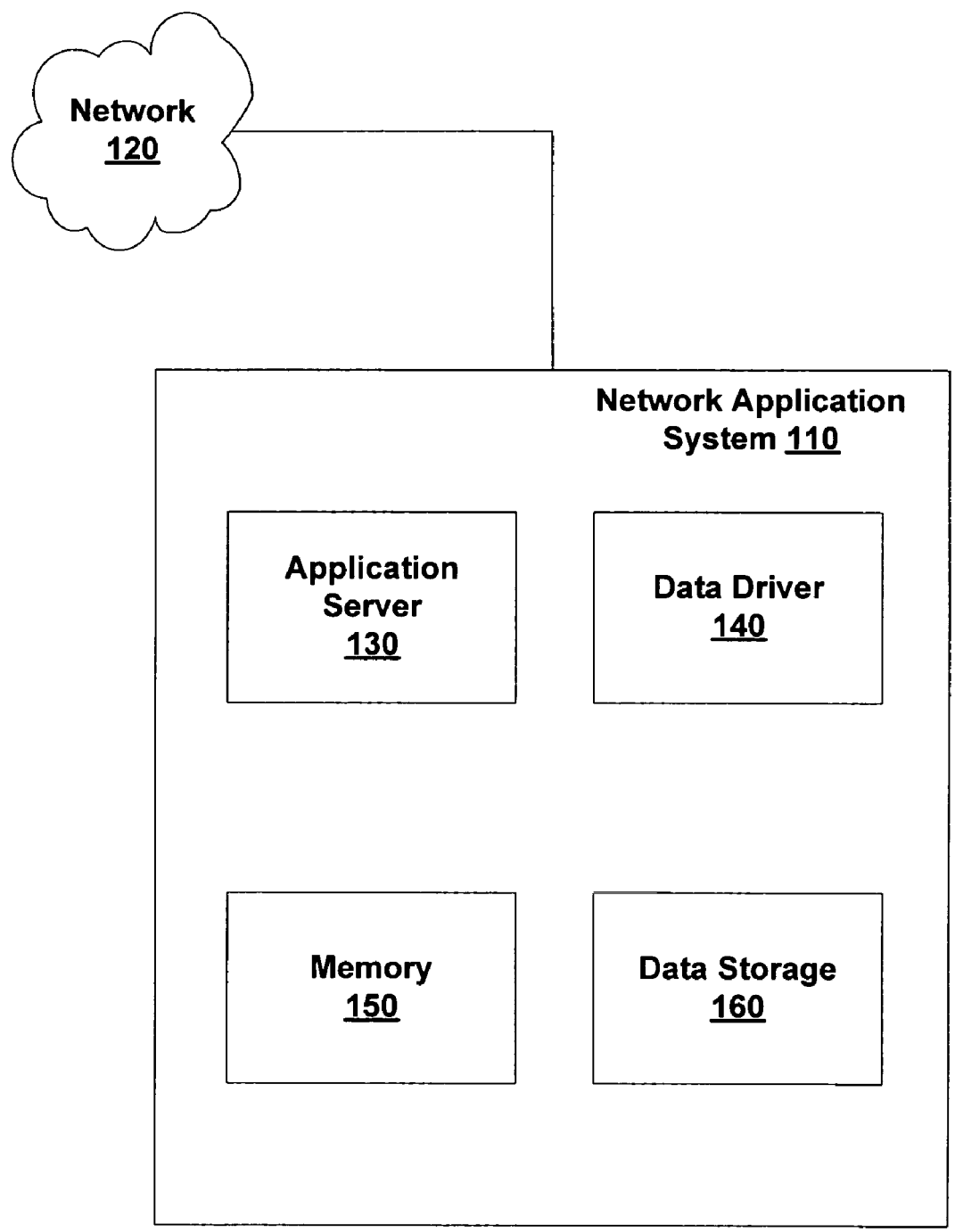
FIG. 1 is a block diagram of a network application system according to various embodiments of the invention.

FIG. 1 is a block diagram of a Network Application System 110, according to various embodiments of the invention. Network Application System 110 is coupled to a DNS based Network 120, such as the Internet, a digital telephone network, a wide area computing network, or the like. Network Application System 110 includes an Application Server 130, a Data Driver 140, optional Memory 150, and Data Storage 160. Application Server 130 is configured to support applications that make use of extended DNS data. For example, in various embodiments, Application Server 130 is a web server, a caching server, an authoritative server, an administrative server, a DNS server, or the like. Application Server 130 is optionally further configured to communicate using a neutral interchange format. In various embodiments, Application Server 130 is optionally also configured to dynamically load a driver compatible with other aspects of the invention. In some embodiments this driver includes Data Driver 140 and in some embodiments this driver is configured to communicate with Data Driver 140.

Data Driver 140 includes computer instructions configured to retrieve or store data in Data Storage 160 and optionally to provide an application programming interface (API) for use in retrieving data from, and storing data to, Data Storage 160. For example, in some embodiments, Data Driver 140 is configured to communicate with Application Server 130 or Network 120 through the neutral interchange format. As discussed further herein, the neutral interchange format allows systems communicating, through Data Driver 140, with Data Storage 160, to selectively make use of the extended DNS data.

Memory 150 is configured to store a cache of data, such as DNS data previously retrieved from Data Storage 160 or received from Network 120. In some embodiments, the cache of data includes extended DNS data stored in the neutral interchange format. In various embodiments, Memory 150 includes random access memory, an optical storage device, an electromagnetic storage device, or some other computer readable media.

Data Storage 160 is configured to store extended DNS data including an extensible attribute. In various embodiments, Data Storage 160 includes a binary table, a file of data sets, a relational database system, or the like. For example, in some embodiments, Data Storage 160 is configured to include a structured database and supporting database software such as IBM DB2®, Oracle®, Berkeley DB, Informix XPS®, or the like. Within a relational database system, extended DNS data can be stored in a variety of formats including the neutral interchange format, DB2, Oracle, Berkeley DB, or the like. In some embodiments, Data Storage 160 is configured to store a binary file including the extensible DNS data, a file including a hierarchical data structure, or the like. Data Storage 160 is optionally distributed among several devices having computer readable media.

Figure 2:
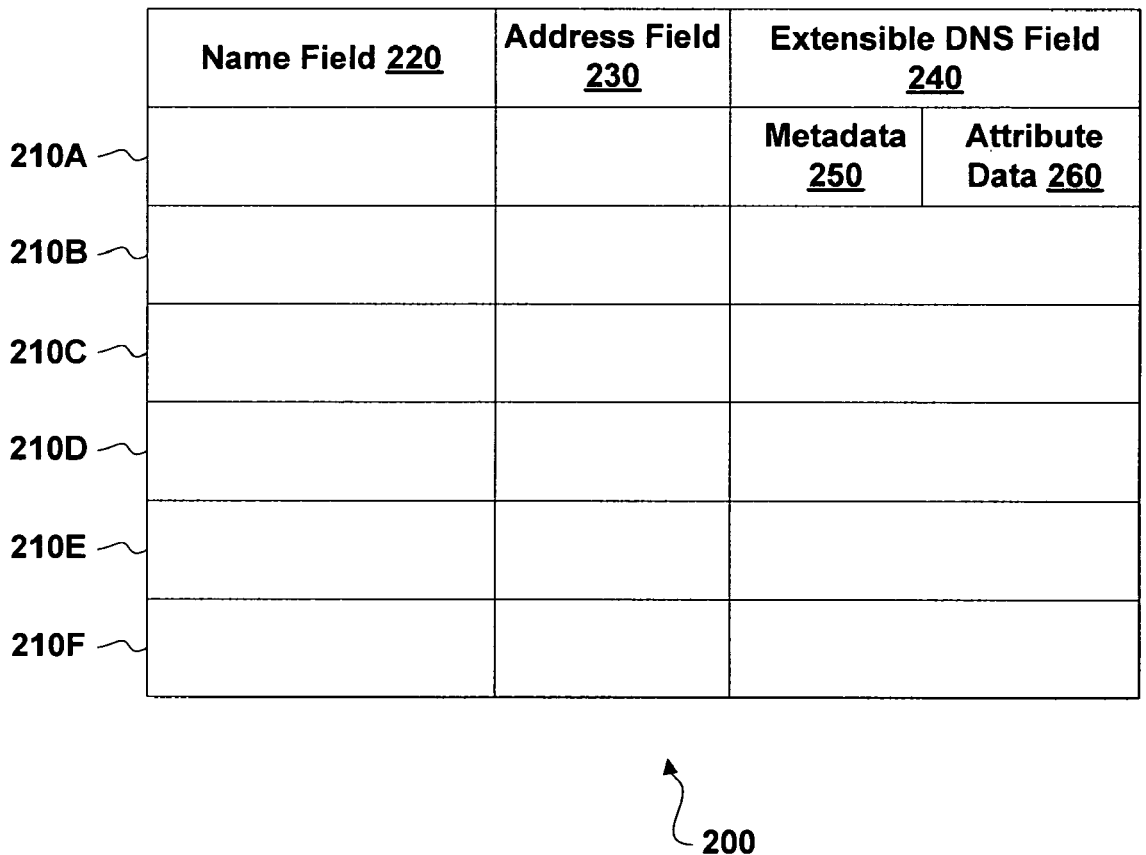
FIG. 2 illustrates an example of extended DNS data, according to various embodiments of the invention.

FIG. 2 illustrates an example of Extended DNS Data, generally designated 200, according to various embodiments of the invention. As shown in FIG. 2, Extended DNS Data Sets 210A-210F include at least three fields, a Name Field 220, an Address Field 230, and an Extensible DNS Field 240. Name Field 220 is configured to store a domain name and Address Field 230 is configured to store a numerical address such as an IP address. Extensible DNS Field 240 includes Metadata 250 and Attribute Data 260. In some embodiments Name Field 220, Address Field 230 and Extensible DNS Field 240 are stored as binary data, rather than as a structured data set. Metadata 250 is configured to characterize a data type of Attribute Data 260. Extensible DNS Field 240 is configured to be interpreted using Data Driver 140. For example, in a typical embodiment, Data Driver 140 will read Extensible DNS Field 240, parse the read data to identify Metadata 250, and use Metadata 250 to interpret Attribute Data 260. In some cases, Attribute Data 260 includes a data set having further metadata and attribute data characterized by the further metadata. In various embodiments, Attribute Data 260 includes one, two, or multiple data values. As part of one of Extended DNS Data Sets 210A-210F, Extensible DNS Field 240, and the data stored therein, is bound to their associated Address Field 230 and Name Field 220. In practice, Extended DNS Data 200 may include additional data fields, such as a data field configured to store time-to-live data.

In various embodiments, Attribute Data 260 applies to extended DNS data of varying degrees of scope. For example, in various cases an instance of Attribute Data 260 applies to an individual member of Extended DNS Data Sets 210A-210F, Extended DNS Data 200 at the same data set level, Extended DNS Data Sets 210A-210F at the same node level, members of Extended DNS Data Sets 210A-210F at the same zone level, or the like. Extended DNS Data 200 at the same data set level include, for example, data sets of the same DNS type. Extended DNS Data 200 at the same node level include data having the same primary or secondary domain name. Extended DNS Data 200 at the same zone level includes data having a common authority (e.g., mail.nominum.com is a different zone than sales.nominum.com if they are managed by different authorities).

Figure 3:
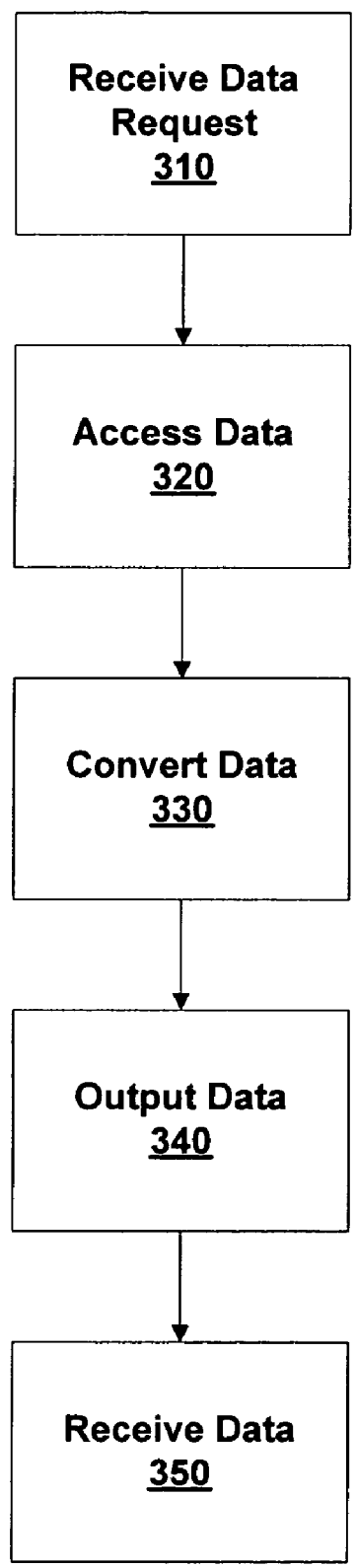
FIG. 3 illustrates a method of reading extended DNS data, according to various embodiments of the invention.

FIG. 3 illustrates a method of reading data from Data Storage 160, according to various embodiments of the invention. In this method, Application Server 130 or computer instructions executing on Network 120 send a request for DNS data to Data Driver 140. In some embodiments, this request is for DNS data to be returned in the neutral interchange format. Responsive to the request, Data Driver 140 reads the required information from Data Storage 160, converts the read data to a format required by the requestor if necessary, and outputs the requested data.

More specifically, in a Receive Data Request Step 310, Data Driver 140 receives a request for Extended DNS Data 200 from Application Server 130 or, in some embodiments, from Network 120. For example, in embodiments wherein Application Server 130 is a DNS server, Application Server 130 may request that Data Driver 140 return an IP address and Attribute Data 260 from Data Storage 160.

In an Access Data Step 320, Data Driver 140 accesses Data Storage 160 to retrieve the requested information. In some embodiments, this access is facilitated by a query to a relational database system. In some embodiments, reading of a member of Extended DNS Data Sets 210A-210F is tracked using an associated Attribute Data 260. In these embodiments, updating of this associated Attribute Data 260 is optionally included in Access Data Step 320.

In an Optional Convert Data Step 330, data read from Data Storage 160 is converted to a neutral interchange format using Data Driver 140. The neutral interchange format includes one or more attribute fields and metadata. The one or more attribute fields are configured to hold, for example, the data received from Data Storage 160 and the metadata is configured to characterized the attribute fields and/or the data they hold. This metadata is further configured such that computer instructions receiving data in the neutral interchange format can parse the received data and identify elements of the received data that the computer instructions are configured to use in further operations. Using the metadata included in the neutral interchange format, Application Server 130 can differentiate between elements of the received data that it is configured to use further and elements of the received data that it is not configured to use further. The neutral interchange format is configured such that Application Server 130 can ignore data, received from Data Driver 140, that Application Server 130 is not configured to use.

In some embodiments, the request received in Receive Data Request Step 310 includes an instruction indicating that Data Driver 140 should omit Convert Data Step 330. In these embodiments, Convert Data Step 330 is skipped. In some embodiments data is already in the neutral interchange format when retrieved from Data Storage 160 in Access Data Step 320. In these embodiments Convert Data Step 330 is not necessary.

In an Output Data Step 340, data read from Data Storage 160, and optionally converted to neutral interchange format in Convert Data Step 330, is provided as output from Data Driver 140. In typical embodiments this output is provided to Application Server 130. However, in some embodiments this output is provided directly to a system included in Network 120.

In an optional Receive Data Step 350, Application Server 130 or a system included in Network 120 receives the output from Data Driver 140 provided in Output Data Step 340. In Receive Data Step 350, the receiving entity optionally parses the extended DNS data to identify Attribute Data 260 of interest. Attribute Data 260 that is not of interest, or that is of a type unknown to the receiving entity, is optionally ignored.

Figure 4:
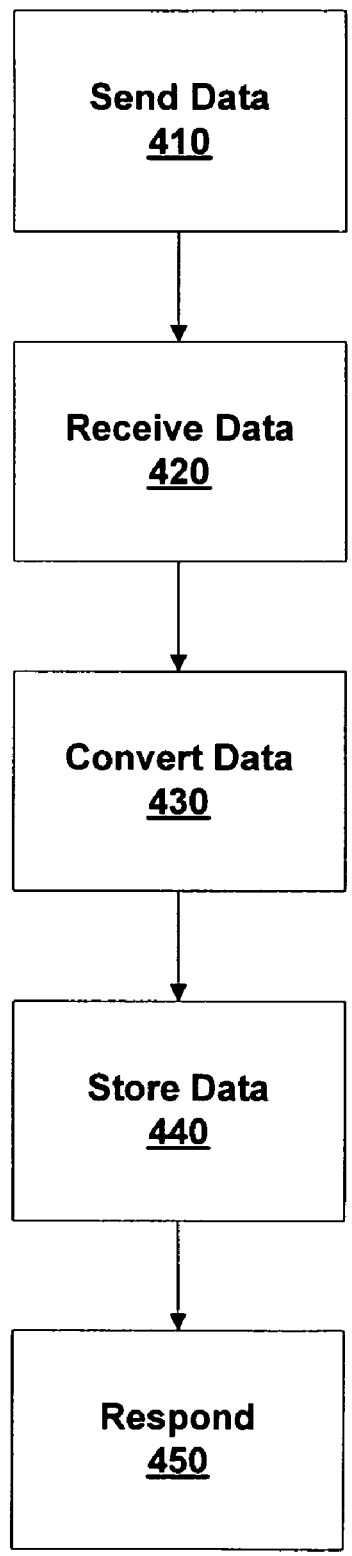
FIG. 4 is an illustration of a method of writing data, according to various embodiments of the invention.

FIG. 4 illustrates a method of writing data to Data Storage 160, according to various embodiments of the invention. In this method, Application Server 130, or computer instructions executing on Network 120, send data to Data Driver 140. This data is typically sent in the neutral interchange format. The sent data is received by Data Driver 140 and optionally converted to a format suitable for storage in Data Storage 160.

More specifically, in a Send Data Step 410, Application Server or some element included in Network 120 sends data to Data Driver 140. In various embodiments, the sent data includes a request for information from Data Storage 160, additions to Extended DNS Data 200, and/or updates to one or more of Extended DNS Data Sets 210A-210F. For example, in some embodiments the sent data includes an updated time-to-live values, and instructions specifying that these updated time-to-live values should apply to a specific zone level under the domain name. This, and similar data, is sent in the neutral interchange format and, thus, includes metadata identifying and characterizing the included values. Because the data sent in Send Data Step 410 is typically sent in the neutral interchange format, it can be configured to query or update specific fields within a member of Extended DNS Data Sets 210A-210F, an entire data set within Extended DNS Data Sets 210A-210F, or members of Extended DNS Data Sets 210A-210F grouped by data set level, node level, or zone level.

In a Receive Data Step 420, Data Driver 140 receives the data sent in Send Data Step 410. In various embodiments, this step includes parsing of the received data to verify correct syntax and format, identification of instructions relating to use of the received data or of data stored in Data Storage 160, and/or identification of other parts of the received data. For example, in one embodiment, Receive Data Step 420 includes identification of data to be written to a specific member of Extended DNS Data Sets 210A-210F, instructions to write this data based on a conditional statement relating to the authority of a user to modify Extended DNS Data 200, and a value representing the user's authority. In another embodiment, Receive Data Step 420 includes identification of a request for resolution of a domain name and identification of a specification that no more than n referral responses be returned.

In an optional Convert Data Step 430, Data Driver 140 converts any of the data received in Receive Data Step 420, that is to be written to Data Storage 160, from the neutral interchange format to the format used to store Extended DNS Data 200 in Data Storage 160. In embodiments wherein the neutral interchange format is used to store data in Data Storage 160, Convert Data Step 430 is not required. In a Store Data Step 440, all or part of the data received in Receive Data Step, and optionally converted in Convert Data Step 430, is written to Extended DNS Data 200 in Data Storage 160. In some embodiments, data received in Receive Data Step 420 and optionally converted in Convert Data Step 430 is cached in Memory 150.

In an optional Respond Step 450, Data Driver 140 responds to the data received in Receive Data Step 420. In various embodiments, this response includes an acknowledgement that the data was received and/or processed, a result of processing the received data, data read from Data Storage 160, or the like.

The systems and methods illustrated herein are applied to a number of specific applications involving the use of DNS data. Illustrative examples of these applications include control of data access, variable presentation of output from Data Driver 140, management of DNS data expiration, load balancing of DNS services, and sorting of DNS data. Each of these applications is discussed in further detail herein.

Various embodiments of the methods illustrated by FIG. 3 include control of read access to parts of Extended DNS Data 200. In these embodiments, Receive Data Request Step 310 includes receiving user identifying information, and in Access Data Step 320, Attribute Data 260 relating to access authority is read from Extended DNS Data 200. In Output Data Step 340 the user identifying information and Attribute Data 260 are used in a comparison to determine if the user has authority to access the requested information. If so, then the requested information is provided as output from Data Driver 140 in Output Data Step 340. If not, then the requested information is not provided as output.

In various embodiments, Attribute Data 260 is used to establish Multiple Levels of authority (i.e., access control). For example, in one embodiment the Extensible DNS Field 240 included in Extended DNS Data Set 210A includes Attribute Data 260 establishing a hierarchical authority structure. In some cases this authority structure is used to establish different authority requirements for accessing data at a zone level than for accessing data at a node level. In some cases, this authority structure is used to establish different authority requirements for accessing different Attribute Data 260 in a single member of Extended DNS Data Sets 210A-210F.

Some embodiments of the methods illustrated by FIG. 4 include control of write access to Extended DNS Data 200. As with read access control, in these embodiments user identifying information is used together with Attribute Data 260 in a comparison to establish a proper level of authority before access is allowed. In the case of write access control, the user identifying information is received in Receive Data Step 420 and the comparison is made prior to writing data to Data Storage 160 in Store Data Step 440. Typically, Attribute Data 260 used in the comparison is obtained by adding a step including reading Data Storage 160 to the methods illustrated by FIG. 4. This step is similar to Access Data Step 320.

Some embodiments of the methods illustrated by FIG. 3 include formatting of the output provided by Data Driver 140 responsive to Attribute Data 260 read from Data Storage 160 in Access Data Step 320. For example, in some embodiments, data included in the output of Data Driver 140 is sorted responsive to Attribute Data 260. In some embodiments, inclusion of data in the output of Data Driver 140 is response to either the presence of a particular Attribute Data 260 and/or the value of Attribute Data 260 that is present.

New load balancing techniques are enabled when Attribute Data 260 is used to sort or rank Extended DNS Data Sets 210A-210F. For example, in various embodiments, it is desirable to distribute DNS referrals among a variety of servers, such as web servers, mail servers, cache servers, authoritative servers, or other network servers. In one embodiment, Attribute Data 260 is used to measure server load by tracking a quantity of referrals made to each server and to rank Extended DNS Data Sets 210A-210F according to this Attribute Data 260. In alternative embodiments external processes are used to monitor the load on a server. For example, in one embodiment a time required for the server to process a request is measured. In another embodiment, the server reports a measure of its load. These measures are stored in Attribute Data 260. Those servers having the greatest load are given a lower priority to receive subsequent referrals. In some embodiments, a subset of the possible referrals read by Data Driver 140 from Data Storage 160 is provided in the output of Data Driver 140. For example, it is not unusual for a request for domain name resolution to result in reading tens of referrals (i.e., members of Extended DNS Data Sets 210A-210F including referral information) to servers. The read referrals are sorted by Data Driver 140 using Attribute Data 260, and a subset of the least used referrals are included in the output of Data Driver 140. This approach balances the load (number of referrals) among the network servers.

For example, in one embodiment wherein load balancing techniques are used, Application Server 130 is a DNS server configured to respond to a request for domain name resolution with no more than ten referral responses. In order to do so the DNS server sorts referral responses retrieved from Data Storage 160, the sorting being dependent on ranking of attributes retrieved from Data Storage 160 and relating to the number of times each read member of Extended DNS Data Sets 210A-210F has been used for referral. Data Driver 140 then provides, as output, data from those Extended DNS Data Sets 210A-210F that have been used the least recently.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated. For example, in addition to IP addresses, which are used herein for illustrative purposes, embodiments of the invention may be applied generally to DNS information such as mail exchange information (MX records), SRV (service location) records, AAAA (IPv6) address, or like data defined within DNS standards. (For DNS standards see, for example, Mockapetris, P., "Domain Names—Concepts and Facilities," STD 13, RFC 1034, November 1987. http://www.ietf.org/rfc/rfc1034.txt, and Mockapetris, P., "Domain Names—Implementation and Specification," STD 13, RFC 1035, November 1987. http://www.ietf.org/rfc/rfc1035.txt, incorporated herein by reference.) These DNS information may be substituted for IP addresses in the embodiments discussed herein and these DNS information may be adapted to include data types defined by future DNS standards.

I claim:

1. A network application system comprising:
    data storage configured to store standard DNS data and extended DNS data, the standard DNS data and extended DNS data being mutually exclusive, the extended DNS data including an extensible DNS field configured to store attribute data and metadata, the metadata configured to characterize a type of the attribute data to a non-DNS application on an application server;
    a data driver configured to read from or write to the data storage, and to convert the extended DNS data between a neutral interchange format and a format used to store the extended DNS data in the data storage, the neutral interchange format including an attribute field and a metadata field, the metadata field being configured for storing data characterizing data stored in the attribute field; and
    a DNS server configured to exchange the extended DNS data with the data driver in the neutral interchange format, to parse the data in the neutral interchange format, and to translate a domain name to DNS information.

2. The network application system of claim 1, wherein the DNS server is further configured to differentiate between elements of the exchanged data that the DNS server is configured to use further and elements of the exchanged data that the DNS server is not configured to use further.

3. A computer readable medium having stored thereupon computer code configured to provide domain name services, the computer code comprising:
    a code segment configured to read extended DNS data, the extended DNS data and standard DNS data being mutually exclusive, the extended DNS data including an extensible DNS field configured to store attribute data and metadata, the metadata configured to characterize a type of the attribute data to a non-DNS application on an application server;
    a code segment configured to convert the read extended DNS data to a neutral interchange format, the neutral interchange format including an attribute field and a metadata field, the metadata field being configured for storing data characterizing data stored in the attribute field; and
    a code segment configured to output the read extended DNS data.

4. The computer readable medium of claim 3, further including a code segment configured to control access to the extended DNS data.

5. The computer readable medium of claim 3, further including a code segment configured to parse the neutral interchange format and to use the metadata to identify attribute data which an application server is configured to use.

6. The computer readable medium of claim 3, further including a code segment configured for use in load balancing referrals in a domain name service.

7. A method of accessing DNS data, the method comprising:
    receiving a data request for standard DNS data;
    accessing data storage to read extended DNS data, the extended DNS data and the standard DNS data being mutually exclusive, the extended DNS data including an extensible DNS field configured to store attribute data and metadata, the metadata configured to characterize a type of the attribute data to a non-DNS application on an application server; and
    outputting at least part of the read extended DNS data.

8. The method of claim 7 wherein the read extended DNS data is outputted in a neutral interchange format, the neutral interchange format including an attribute field and a metadata field, the metadata field being configured for storing data characterizing data stored in the attribute field.

9. The method of claim 7, further including converting the read extended DNS data to a neutral interchange format, the neutral interchange format including an attribute field and a metadata field, the metadata field being configured for storing data characterizing data stored in the attribute field.

10. The method of claim 7, further including presenting the outputted extended DNS data responsive to the attribute data.

11. The method of claim 7, wherein the data request includes a request for translating a domain name to an MX record.

12. The method of claim 7, wherein the data request includes a request for translating a domain name to an IP address.

13. The method of claim 7, wherein the extended DNS data is sorted using the attribute data.

14. The method of claim 7, wherein the outputted data is a subset of the read extended DNS data.

15. The method of claim 7, further including using the attribute data to load balance a domain name service.

16. The method of claim 7, further including using the attribute data to control access to the standard DNS data.

17. A method of storing DNS data, the method comprising:
    receiving standard DNS data; and
    storing the received standard DNS data in a data storage configured to store extended DNS data, the extended DNS data and the standard DNS data being mutually exclusive, the extended DNS data including an extensible DNS field configured to store attribute data and metadata, the metadata configured to characterize a type of the attribute data to a non-DNS application on an application server.

18. The method of claim 17, further including using the attribute data to determine authority to write the standard DNS data to the data storage.

19. The method of claim 18, wherein the authority to write to the standard DNS data is at the node level or the zone level.

20. The method of claim 18, wherein the authority to write to the standard DNS data is specific to a field within an extensible DNS data set.

21. The method of claim 17, wherein the standard DNS data is received in a neutral interchange format.

22. A computer readable medium having stored thereupon computer code for a domain name service, the computer code comprising:
    a code segment for receiving a request for standard DNS data;
    a code segment for reading extended DNS data in response to the request, the extended DNS data and the standard DNS data being mutually exclusive, the extended DNS data including an extensible DNS field configured to store attribute data and metadata, the metadata configured to characterize a type of the attribute data to a non-DNS application on an application server; and a code segment for outputting at least part of the read extended DNS data.

23. A computer readable medium having stored thereupon computer code for a domain name service, the computer code comprising:

a code segment for receiving standard DNS data; and a code segment for storing the received DNS data in a data storage configured to store extended DNS data, the extended DNS data and the standard DNS data being mutually exclusive, the extended DNS data including an extensible DNS field configured to store attribute data and metadata, the metadata configured to characterize a type of the attribute data to a non-DNS application on an application server.

24. The computer readable medium having stored thereupon computer code of claim 23, the computer code further comprising a code segment for using the extended DNS data to determine authority to write the standard DNS data.

* * * * *